United States Patent [19]
Esslinger et al.

[11] Patent Number: 5,461,548
[45] Date of Patent: Oct. 24, 1995

[54] FIBER OPTIC BACKLIGHT ILLUMINATION PANEL FOR GRAPHICS/LOGOS ON A MOVING VEHICLE

[76] Inventors: James T. Esslinger, 2403 Rolling Acres, Champaign, Ill. 61821; Wayne Yonce, 2009 Prairie View Dr., Urbana, Ill. 61821

[21] Appl. No.: 226,030

[22] Filed: Apr. 11, 1994

[51] Int. Cl.⁶ ........................................................ F21V 7/04
[52] U.S. Cl. .............................. 362/32; 362/812; 40/547; 385/901
[58] Field of Search ................................ 362/31, 32, 806, 362/80, 812, 330, 375; 385/100, 102, 106, 901; 40/546, 547

[56] References Cited

U.S. PATENT DOCUMENTS

| | | |
|---|---|---|
| 4,422,719 | 12/1983 | Orcutt . |
| 4,640,592 | 2/1987 | Nishimura et al. . |
| 4,845,596 | 4/1989 | Mouissie . |
| 4,885,663 | 12/1989 | Parker ........................................ 362/32 |
| 4,907,132 | 3/1990 | Parker . |
| 4,918,578 | 4/1990 | Thompson . |
| 4,924,612 | 5/1990 | Kopelman . |
| 5,036,435 | 7/1991 | Tokuda et al. . |
| 5,042,892 | 8/1991 | Chiu et al. . |
| 5,122,933 | 6/1992 | Johnson ...................................... 362/32 |
| 5,249,105 | 9/1993 | Koizumi ..................................... 362/32 |
| 5,333,228 | 7/1994 | Kingstone .................................. 362/32 |

*Primary Examiner*—James C. Yeung
*Attorney, Agent, or Firm*—Chen Wang; Willian Brinks Hofer Gilson & Lione; Hugh A. Abrams

[57] ABSTRACT

An illumination panel for use in large-scale stationary or mobile applications is disclosed. The illumination panel includes a cover and a reflecting back surface held together by a supporting element such that a cavity is defined therebetween; a light source; fiber optic cable extending from the light source and into the cavity, wherein the fiber optic cable consists of a plurality of unsheathed optical fiber cores bundled together within a hollow clear plastic flexible PVC tube.

20 Claims, 2 Drawing Sheets

U.S. Patent  Oct. 24, 1995  Sheet 1 of 2  5,461,548

FIBER OPTIC BACKLIGHT ILLUMINATION PANEL FOR GRAPHICS/LOGOS ON A MOVING VEHICLE

BACKGROUND OF THE INVENTION

1. Field of the Invention

This invention generally relates to an illuminated light panel which utilizes the sidelight that escapes from unsheathed fiber optic cable.

2. Description of the Prior Art

A variety of illumination techniques have been used to form light panels and back illuminated signs.

For example, U.S. Pat. No. 4,918,578 issued to Thompson discloses a device utilizing flexible strands of incandescent light bulbs for back illumination of signs. Specifically, Thompson discloses a light piping display illuminated by a flexible light string. The display includes a panel having a light scattering design. The flexible light string extends along the perimeter of the panel and illuminates the design. The flexible light string includes a plurality of spaced-apart, small incandescent glass bulbs. Such a design is too impractical to consider for use on a large format illumination panel or on a mobil illumination panel. Problems with bulb reliability, and difficulty in changing bulbs would preclude using this design in such applications.

Others have disclosed various designs that utilize fiber optics for illumination. Fiber optic technology has evolved over the past few decades to now include many distinct types of optical fibers designed for many different applications. As a result, the various optical fiber designs are not interchangable, and many such designs may not be effective or practical in any given application.

U.S. Pat. No. 4,924,612 issued to Kopelman discloses a sign illuminated with a fiber optic structure. In general, Kopelman discloses an apparatus having a light source that directs light into a light inlet portion of a fiber optic structure such that light is emitted from a light outlet portion thereof and directed onto a configuration forming structure. The Kopelman fiber optic structure can include (1) both fiber optic cable and fiber optic plastic; or (2) fiber optic plastic embodying fluorescent and/or luminescent materials. The fiber optic cable used in Kopelman is a cladded single fiber optic cable having crystalline light-conveying channels.

U.S. Pat. No. 4,422,719 to Orcutt discloses the use of a light guide comprising a single optical transmission core of clear resinous plastic having a transparent or translucent sleeve which is shrink-fitted or otherwise tightly fitted around the periphery. The sleeve substantially seals the core from the surrounding air, and is designed to laterally disperse, diffuse, or refract through its sidewall a substantial component of light transmitted along the core.

U.S. Pat. No. 5,036,435 to Tokuda et al. discloses an illumination panel including an optical fiber sheet located between a surface panel and a reflecting layer. The optical fiber sheet is formed by arranging a plurality of optical fibers which have one end optically connected to a light source. The optical fibers include a light-leaking portion on at least one surface.

The prior art illumination panels that use fiber optics offer different ways for the light from the light source to travel through and escape the optic cable. One panel (Tokuda) only allows one end of the fiber optic cable to be plugged into the light source, which causes problems with light density the further it travels from the light source. Those prior art devices that allow both ends of the cable to be plugged into the light source, all have some sort of light blocking cladding or sheathing around individual cables that are subject to some form of alteration. Some alterations are in the form of flaws such as notches in the cables which act as light-leaking portions (Tokuda) and by removing less cladding along the cable that is closer to the source of light (Chiu).

These and other prior art illumination devices that utilize fiber optics have been inadequate for use in backlighting a relatively large panel or sign, and particularly a large mobile panel or sign. In fact, prior art applications of illumination panels have been limited to relatively small scale applications. Specifically, prior art designs are adapted merely for background illumination of flat information display units such as liquid crystal display panels, text panels, military and commercial instrument panels, etc. Larger scale applications require vast amounts of light. In accordance with prior art designs, one could not obtain a sufficient amount, while maintaining a relatively thin illumination panel. In addition, prior art designs do not provide a large format illumination panel that can be mounted on a motor vehicle such that the light therefrom is non-obtrusive to other motorist.

OBJECTS OF THE INVENTION

It is therefore an object of the present invention to provide a novel illumination design that can be used on relatively large panels or signs that are, nonetheless, relatively thin. More specifically, it is an object of the present invention to provide a novel illuminated panel that is no greater than 1¼ inch thick, and having unlimited vertical and horizontal dimensions.

It is a further object of the present invention to provide a novel illumination design utilizing a high intensity light source to illuminate flexible fiber optic cable that can be easily contoured within a sign to trace letters, figures or graphics.

It is another object of this invention to provide a novel mobile illuminated panel designed to display graphics at night.

It is yet another object of the present invention to provide an illuminated panel device that can be mounted on the side(s) of a motor vehicle and meet all highway and safety standards set forth in the Federal Motor Carrier Safety Regulations. More specifically, it is an object of the present invention to provide a novel mobile illuminated panel that can be seen at great distances away, and yet is not obtrusive to drivers passing in either direction of the vehicle.

SUMMARY OF THE INVENTION

These and other objects are met by a novel mobile illumination panel that utilizes an illumination cable made from a plurality of unsheathed thin optical fiber cores bundled together within a hollow clear plastic flexible PVC tubing. Specifically, graphics are heat transferred onto a flexible face fabric which is stretched over and attached to a light-weight metal frame. The illumination cable is placed along the backside of the fabric and mounted onto a rigid back reflecting surface. A high intensity discharge (HID) type lamp in an enclosed light box may serve as the light source for the bundled fiber optic cable. Sidelight escapes from the multiple thin cables, reflects off the back reflecting surface, and illuminates the graphics and/or letters on the flexible face heat transfer fabric.

BRIEF DESCRIPTION OF THE DRAWINGS

For a more complete understanding of this invention, reference should now be made to the embodiments illustrated in greater detail in the accompanying drawings, and described by way of example only. In the drawings.

DETAILED DESCRIPTION OF THE INVENTION

Figure 1:
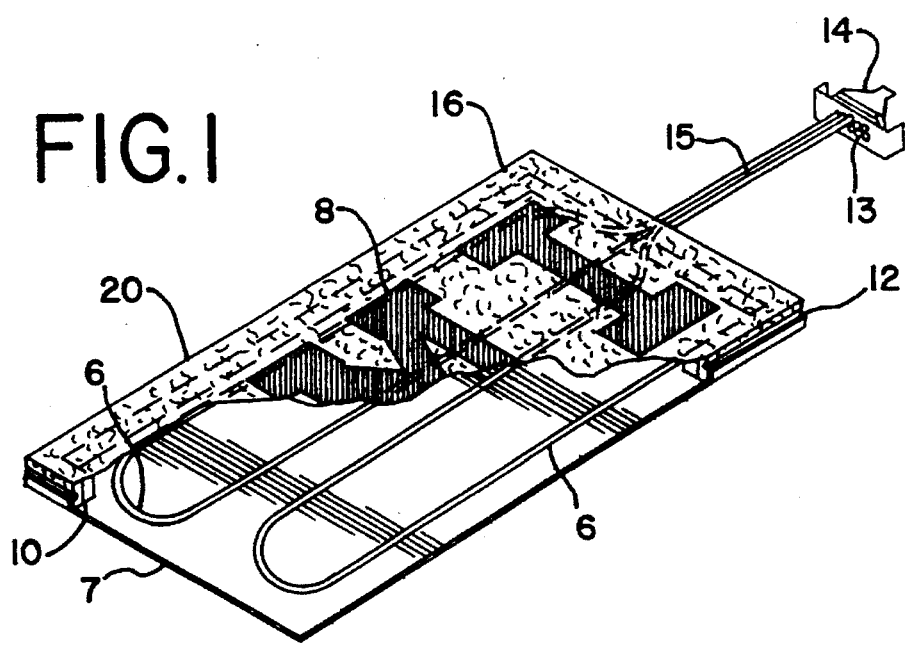
FIG. 1 shows a perspective view of an embodiment of an illuminated sign made in accordance with the present invention and includes a cut-away section of the flexible face heat transfer color fabric.

Referring now to FIG. 1, a preferred embodiment of the present invention is shown. In particular, the present invention is an illumination panel 20 that includes five basic components—(1) a supporting element such as a frame 10; (2) a flexible heat transfer fabric or cover 8; (3) fiber optic illumination cable 15; (4) a reflecting back surface 7; and (5) a light source 14.

The frame 10 is relatively thin, preferably 1¼ inch thick or less, and is preferably made with a light metal or a high impact plastic. The frame 10 extends around the perimeter of the panel 20. As described below, thinner frames may be used depending on the light requirements of the application. In an alternative embodiment, light panel 20 may be constructed without a frame. Instead, an adhesive may be used as the supporting element, whereby the adhesive attaches the heat transfer fabric or cover 8, the illumination cable 15, and the reflecting back surface 7 to form an extremely thin rigid solid single unit.

The fabric or cover 8 is stretched over the frame 10 and attached thereto by any conventional manner. In utilizing the present invention to form an illumination panel, the fabric 8 is simply a white fabric. In forming a sign, however, the fabric 8 may include graphics, and is preferably prepared by a conventional heat transfer process which offers the most versatile and cost effective alternative for limited production runs.

Contrary to other methods of applying graphics, the heat transfer process embeds the graphic colors into the fabric, and eliminates the possibility that the graphics may peel or flake from the fabric. In accordance with a conventional heat transfer process, an ultra-thin dry pigmented vinyl ink is applied to a heated flexible vinyl substrate or cover. The process is a dry transfer application without excess chemicals or solvents. A heat transfer machine uses heat and a vacuum as a transfer medium. When the fabric is heated, it softens, which allows the vinyl ink to melt onto the surface. Furthermore, with such a process, there is virtually no limit to the artistic possibilities, allowing even the most complex custom-made graphics to be heat transferred. Heat transfer fabric manufactured by Signtech, Cooly Bright, or 3M, has been found to be suitable for use as the flexible face heat transfer fabric 8.

Using flexible fabric and graphics made in accordance with the heat transfer process has been found to be best suited for outdoor or mobile applications, which require an ability to withstand excess wind and other natural elements. For indoor or stationary applications, other methods for forming graphics may be used, e.g. gluing the graphics onto the fabric. Additionally, a rigid form of plastic may be used as a substrate or cover 8 in a stationary application. In a mobil application, however, a substrate in the form of rigid plastic would tend to crack and break apart due to the road stress of the vehicle.

Figure 2:
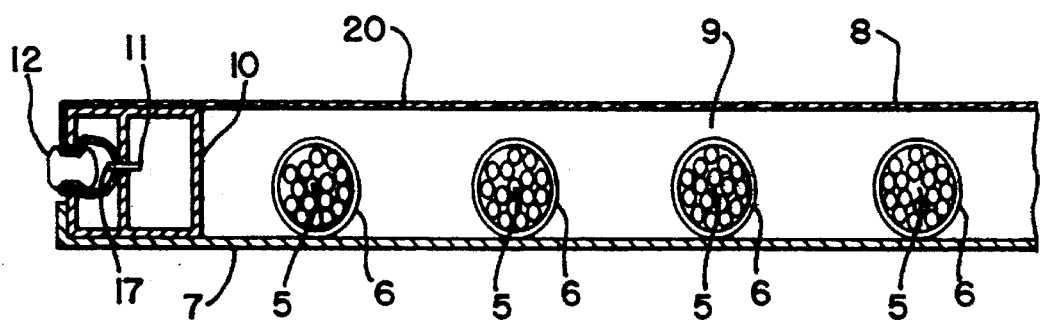
FIG. 2 is an enlarged cross-section of the illuminated sign of the present invention as shown in FIG. 1.

In accordance with a preferred embodiment of the present invention, as can best be seen in FIG. 2, the frame 10 includes a recess 17 along its perimeter. The flexible heat transfer fabric 8 is secured within the recess 17 by use of a vinyl trim 12. The fabric 8 is attached to the vinyl trim 12 with a staple 11, and the vinyl trim 12 is then secured within the recess 17. The vinyl trim 12 is a UV stabilized vinyl trim. One skilled in the art will readily appreciate that other methods may be used for attaching the fabric 8 to the frame 10.

The reflecting back surface 7 is preferably a thin, lightweight, rigid metal surface. In accordance with a preferred embodiment, the reflecting surface is a ⅟32" thick sheet of aluminum.

Figure 3:
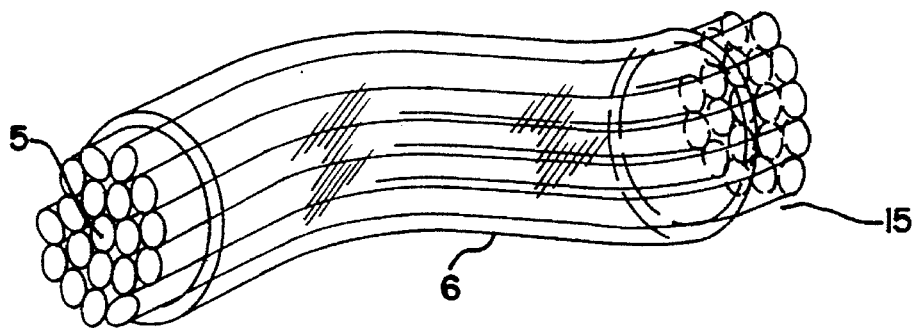
FIG. 3 shows a plurality of flexible fiber optic cores bunched together and passing through a clear PVC flexible tube, of the type that may be used in this invention.

Referring now to FIG. 3 of the drawings, an illumination cable 15 used in accordance with the present invention is shown. The illumination cable 15 includes a plurality of unsheathed optical fiber strands or cores 5 that are bundled together within a hollow clear flexible PVC tube 6. By using a flexible PVC tube 6, cable 15 can be run back and forth behind the fabric or cover 8 for maximum illumination of the sign or panel 20, as illustrated in FIG. 1.

The core 5 may be made from a variety of materials including glass, plastic, or synthetic fused silica ("quartz"). Preferably, core 5 is made from either multi-number plastic or glass fibers since they are the best choice for illumination applications. A large single fiber optic core of the same diameter as a multi-number core is not as flexible as the multi-number core. Nor is it as bright as a multi-number core. As a result, since the cable 15 runs back and forth behind fabric 8, large diameter single fibers are difficult to use when anticipated bending radii for the cable 15 are tight.

Various size tubes 6 may be used, e.g., ¼ inch, ⅜ inch, ½ inch or ⅝ inch in diameter. Depending on the size of the tube 6 and the material used for the core, the cable 15 could include up to 300 cores 5, and preferably up to 200. In some applications, it may be advantageous to use fewer strands of fiber optic cores 5 inside a smaller diameter clear plastic tube 6, thereby allowing for thinner frame applications.

We have found that a ½ inch bundle of 100 thin core fibers made from either glass or plastic fiber optics (with the average core diameter being less than approximately 0.005 inch) is superior to a single large ½ inch single plastic fiber optic core for a number of reasons. The 100 fiber core bundle will allow a workman to perform a bend radius down to 2 inches, while a ½ inch large single plastic core would require the use of a special heat gun in order to obtain the same bend radius. As a result, the 100 core bundle is much more user friendly. Moreover, the 100 core bundle allows much more sidelight to escape than the single large core. This allows for better light distribution that is reflected in all directions from the bundle, and eventually out through the substrate of the illumination panel. Consequently, the bundling of the cores 5 in accordance with the present invention is superior to a large single core.

Light is transmitted through the illumination cable 15 from the light source 14. Preferably, all fiber optic cables 15 are looped back to the light source 14 so that both ends of the cable 15 are in front of the lamp for maximum usage of light. Multiple cable ends 13 can be mounted in front of one light source 14.

In accordance with one embodiment of the present invention, the light source 14 consists of a box containing (1) one or more high intensity discharge (HID) lamp(s), (2) electronic gear in the form of a transformer/invertor to fire and run the HID lamp(s), (3) a cooling fan, and (4) mounting brackets to hold the ends of the fiber optic cables. Preferably, the box is weather proof and allows no light to escape. Moreover, in mobile applications of the present invention, as shown in FIG. 6, the light source 14 may be mounted on the exterior of the vehicle or trailer, and may be powered from existing vehicle output.

Figure 4:
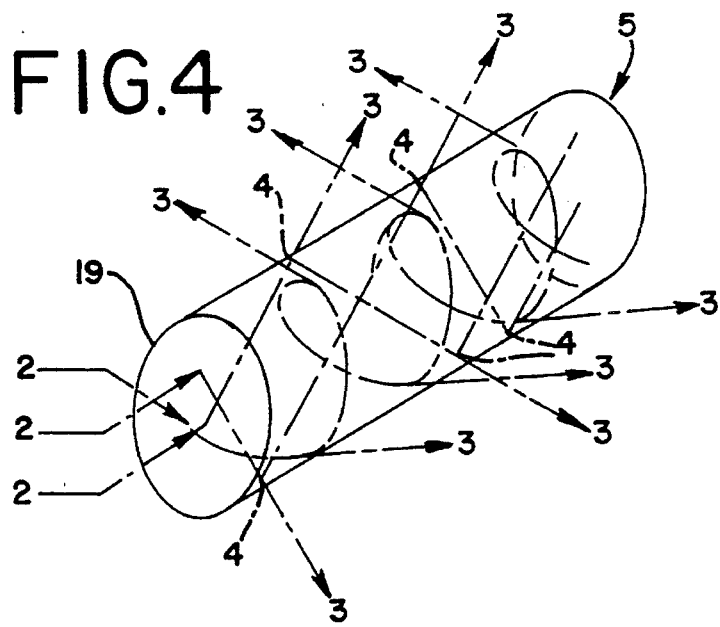
FIG. 4 shows a section of an individual fiber optic core used in the present invention, and illustrates the light reflection pattern within the core.
Figure 5:
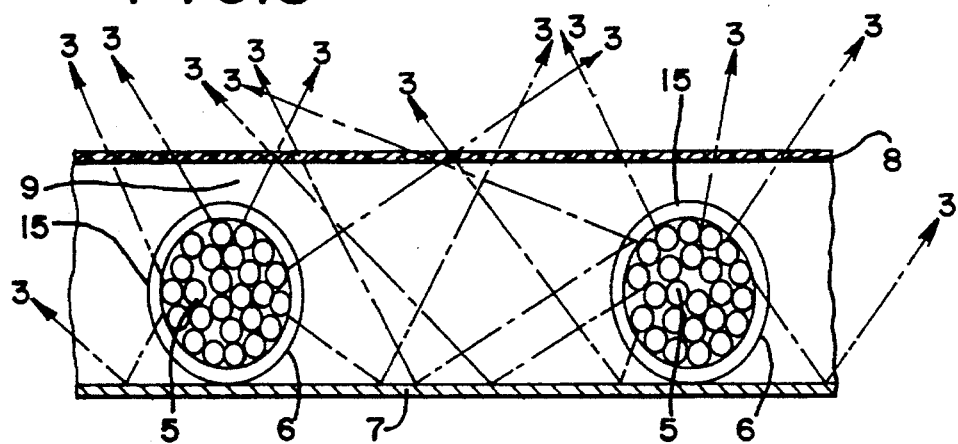
FIG. 5 is a cross-sectional view of an embodiment of a backlight illumination panel constructed in accordance with the present invention, and shows the light reflection patterns within the device.

As the light travels through the cores 5, it is reflected therefrom as sidelight. A typical light reflection pattern is illustrated in FIGS. 4 and 5. Light rays 2 from the light source enter the core 5 at one end 19. Reflected light 3 escapes the core 5 at the interface reflection point 4 in the fiber optic core 5. As can best be seen in FIG. 5, the reflected light 3 illuminates the heat transfer fabric 8 by escaping through the clear tube 6 of the cable 15. Some unique properties of this type of lighting are that there is no electric current, nor heat running through the cable or behind the fabric. Nor are there any lamps behind the fabric substrate that would require maintenance or changing.

After a certain length of cable 15 has been used, there is a diminishing effect on the amount of light that comes from the cable 15. This diminishing effect can be corrected by using multiple cables. For example, instead of using a maximum length of 180 feet for a single cable 15, two cables 15 of 90 feet each, or a combination thereof, can be used.

Figure 6:
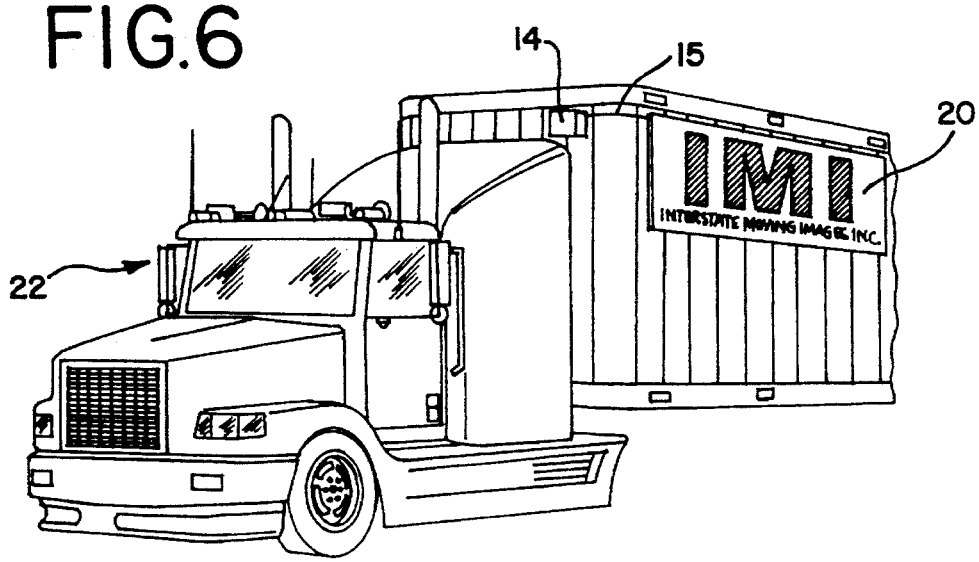
FIG. 6 is a perspective view of a truck having mounted thereon the novel illumination sign of the present invention.

As shown in FIG. 6, an illumination panel 20 made in accordance with the present invention is preferably mounted on the side of vehicle such as a semitrailer 22. The illumination panel 20 would be mounted such that it could be illuminated when the vehicles lighting system is activated for night time driving. The unique design provides a very even, soft glow of the sign graphics that is unobtrusive to other drivers. It provides an illumination that can be seen with great clarity at long distances, but with minimal to no glare to other vehicles.

The following example is provided to further illustrate the novel illumination panel in accordance with the present invention, and is not intended to limit the scope of this invention in any way.

An illumination panel or sign in accordance with the present invention was made as follows. The dimensions of the illumination panel were 4 feet high, 4 feed wide, and 1 inch thick. One inch square metal tubing was used to make the 4'×4' frame. A gloss white 4'×4' metal sheet of aluminum ($\frac{1}{32}$" thick) was used for the back refleting surface, and was attached to the back of the frame with commercial pop rivits. A vinyl substaate of 22 mils with heat transfer graphics applied to the fabric was stretched across the front of the metal frame and attached thereto.

A fiber optic cable was placed between the substrate and the back reflecting surface. The fiber optic cable consisted of a bundle of 100 fiber optic cores inside of a clear PVC tube with an outside diameter of ½ inch. The clear PVC tubing was attached to the back reflecting surface using clear polypropylene cable clamps. This allowed the 100 thin cores of fiber optics to "hover" over the back reflecting surface at a distance of between about $\frac{3}{32}$" to $\frac{13}{32}$". By allowing the fiber optic cores to "hover" over the back reflecting surface in this manner, instead of being applied directly to the surface without the tubing or the clamps, more reflecting light is obtained.

The fabric substrate was separated from the PVC tubing by a ½ inch space. This ½ inch space is important in the construction of the illumination panel because it acts as a light defuser for the sidelight that comes from the cable. This allows for a more even distribution of the light coming from the cable, and impedes the formation of "hot spots" on the substrate. A "hot spot" is a brighter concentration of light that can happen anywhere on the substrate, particularly if the substrate is allowed to come into contact with the cable.

Each end of the PVC tubing was extended outside of the illumination panel by a length of about seven feet, and was plugged into an optical port of the light box. In accordance with this specific embodiment, only one cable was used having a length totaling 70 feet. Therefore, only two ends were plugged into the optical port of the light box. The seven foot length between the illumination panel and the light box was jacketed so that no sidelight escaped. In addition, no light was allowed to escape from the light box. As a result, the only light that was seen from this application was the cool graphic glow coming from behind the colored fabric substrate.

This illumination panel was hung on the drivers side of a 24 foot commercial "box" truck. The light box was mounted on the front end of the "box" above the drivers cab. The jacketed cables ran from the mounted illumination panel on the side, around the front corner of the "box" into the optical port of the light box. The light box was powered by the truck's battery, and was wired such that the panel was only illuminated when the truck's lighting system is turned on for night time driving. During the daytime the colored graphics on the illumination panel function just as any type of prior art painted or decaled graphics currently function, i.e. advertising and promoting the trucks company name and/or products.

In accordance with another embodiment, an illumination panel was mounted on a tanker truck. The illumination panel's dimensions were 1'×35'×1". In this example, everything was very similar to the box truck example described above. However, the total single cable length was 122 feet. The illumination panel was mounted again on the drivers side of the tanker truck over the existing graphics. The light box was mounted on a reinforced flat vertical area on the front end of the tanker trailer.

We claim:

1. An illumination panel comprising:

a cover and a reflecting back surface held together by a supporting element such that a cavity is defined between the cover and the reflecting back surface, said cavity having a first end and an opposite end, said cavity having a first half and a second half divided by a line bisecting said first end and said opposite end;

a light source at said first end of said cavity;

a first fiber optic cable and a second fiber optic cable extending from the light source and into the cavity, said first fiber optic cable transversing the distance across said first half of said cavity at least twice, said second fiber optic cable transversing the distance across said second half of said cavity at least twice, said first fiber optic cable and said second fiber optic cable comprise a plurality of unsheathed optical fiber cores bundled together within a clear flexible tube.

2. An illumination panel in accordance with claim 1 wherein said supporting element is a frame that extends around the perimeter of the panel.

3. An illumination panel in accordance with claim 2 wherein said frame is 1¼ inch thick or less.

4. An illumination panel in accordance with claim 1 wherein the supporting element is an adhesive that attaches the cover, the cable, and the reflecting back surface to form a single unit.

5. An illumination panel in accordance with claim 1 wherein said cover is a flexible heat transfer fabric.

6. An illumination panel in accordance with claim 5 wherein said flexible heat transfer fabric includes graphics embedded therein.

7. An illumination panel in accordance with claim 1 wherein the unsheathed optical fiber cores are made from a material selected from the group consisting essentially of glass, plastic, or quartz.

8. An illumination panel in accordance with claim 1 wherein the fiber optic cable includes up to 300 cores.

9. An illumination panel in accordance with claim 1 wherein the fiber optic cable includes up to 200 cores.

10. An illumination panel in accordance with claim 1 wherein said reflecting back surface is a rigid reflecting surface consisting of a metal sheet of aluminum.

11. An illumination panel in accordance with claim 1 wherein the light source consists of a box containing: (1) one or more high intensity discharge (HID) lamp(s), (2) electronic gear in the form of a transformer/invertor to fire and run the HID lamp(s), (3) a cooling fan, and (4) mounting members to secure an end of the fiber optic cable.

12. An illumination panel in accordance with claim 1 wherein said illumination panel is mounted on the side of a motor vehicle.

13. An illumination panel comprising: a flexible heat transfer fabric and a rigid reflecting back surface held together by a frame extending around the perimeter of the panel, wherein the frame interconnects the fabric and the back surface such that a cavity is defined therebetween, said cavity having a first end and an opposite end, said cavity having a first half and a second half divided by a line bisecting said first end and said opposite end;

a light source at said first end of said cavity;

a first fiber optic cable and a second fiber optic cable extending from the light source and into the cavity, said first fiber optic cable transversing the distance across said first half of said cavity at least twice, said second fiber optic cable transversing the distance across said second half of said cavity at least twice, said first fiber optic cable and said second fiber optic cable comprise up to 300 unsheathed optical fiber cores bundled together within a clear flexible tube.

14. An illumination panel in accordance with claim 13 wherein said frame is 1¼ inch thick or less.

15. An illumination panel in accordance with claim 13 wherein the fiber optic cable includes up to 200 cores.

16. An illumination panel in accordance with claim 13 wherein said reflecting back surface is a rigid reflecting surface consisting of a metal sheet of aluminum.

17. An illumination panel in accordance with claim 13 wherein the unsheathed optical fiber cores are made from a material selected from the group consisting essentially of glass, plastic, or quartz.

18. An illumination panel in accordance with claim 13 wherein the light source consists of a box containing: (1) one or more high intensity discharge (HID) lamp(s), (2) electronic gear in the form of a transformer/invertor to fire and run the HID lamp(s), (3) a cooling fan, and (4) mounting members to secure an end of the fiber optic cable.

19. An illumination panel for mounting on the side of a motor vehicle comprising:

a rigid reflecting back surface consisting of a sheet of metal;

a flexible heat transfer fabric attached to the rigid reflecting back surface by a frame extending around the perimeter of the panel, wherein the frame is 1¼ inch thick or less, and interconnects the fabric and the back surface such that a cavity is defined therebetween, said cavity having a first end and an opposite end, said cavity having a first half and a second half divided by a line bisecting said first end and said opposite end;

a light source at said first end of said cavity consisting of a box containing: (1) one or more high intensity discharge (HID) lamp(s), (2) electronic gear in the form of a transformer/invertor to fire and run the HID lamp(s), (3) a cooling fan, and (4) mounting members to secure an end of a fiber optic cable;

a first fiber optic cable and a second fiber optic cable extending from the light source and into the cavity, said first fiber optic cable transversing the distance across said first half of said cavity at least twice, said second fiber optic cable transversing the distance across said second half of said cavity at least twice, said first fiber optic cable and said second fiber optic cable comprise up to 300 unsheathed optical fiber cores bundled together within a clear flexible tube, wherein the unsheathed optical fiber cores are made from a material selected from the group consisting essentially of glass, plastic, or quartz.

20. An illumination panel in accordance with claim 19 wherein the fiber optic cable includes up to 200 cores.

* * * * *